United States Patent [19]

Falk

[11] 4,396,792
[45] Aug. 2, 1983

[54] REUSABLE THERMOCOUPLE ASSEMBLY

[76] Inventor: Richard A. Falk, 519 Westminster Dr., Waukesha, Wis. 53186

[21] Appl. No.: 255,080

[22] Filed: Apr. 17, 1981

[51] Int. Cl.$^3$ ............................................. H01L 35/02
[52] U.S. Cl. ..................................... 136/234; 29/573; 136/242; 374/139
[58] Field of Search ................... 29/573; 136/230, 232, 136/234, 242; 374/139

[56] References Cited

U.S. PATENT DOCUMENTS

| | | | |
|---|---|---|---|
| 3,024,295 | 3/1962 | Moore | 136/234 |
| 3,121,038 | 2/1964 | Perotte | 136/230 X |
| 3,816,183 | 7/1974 | Kraus | 136/234 |
| 4,135,538 | 1/1979 | Kurita | 136/234 |
| 4,229,230 | 10/1980 | Hance | 136/234 |

FOREIGN PATENT DOCUMENTS 55-71920  5/1980  Japan ............................... 136/242

OTHER PUBLICATIONS

Leeds & Northrup Folder ND 46-33-643(2) 40-960, one page.

Primary Examiner—Leland A. Sebastian
Attorney, Agent, or Firm—Henry C. Fuller

[57] ABSTRACT

A repeating use thermocouple assembly includes a refractory fiber protective sleeve with a dome-shaped end wall which encapsulates the assembly. A blanket of refractory fiber is wrapped around the thermocouple element to protect the components of the assembly.

1 Claim, 5 Drawing Figures

U.S. Patent     Aug. 2, 1983     4,396,792
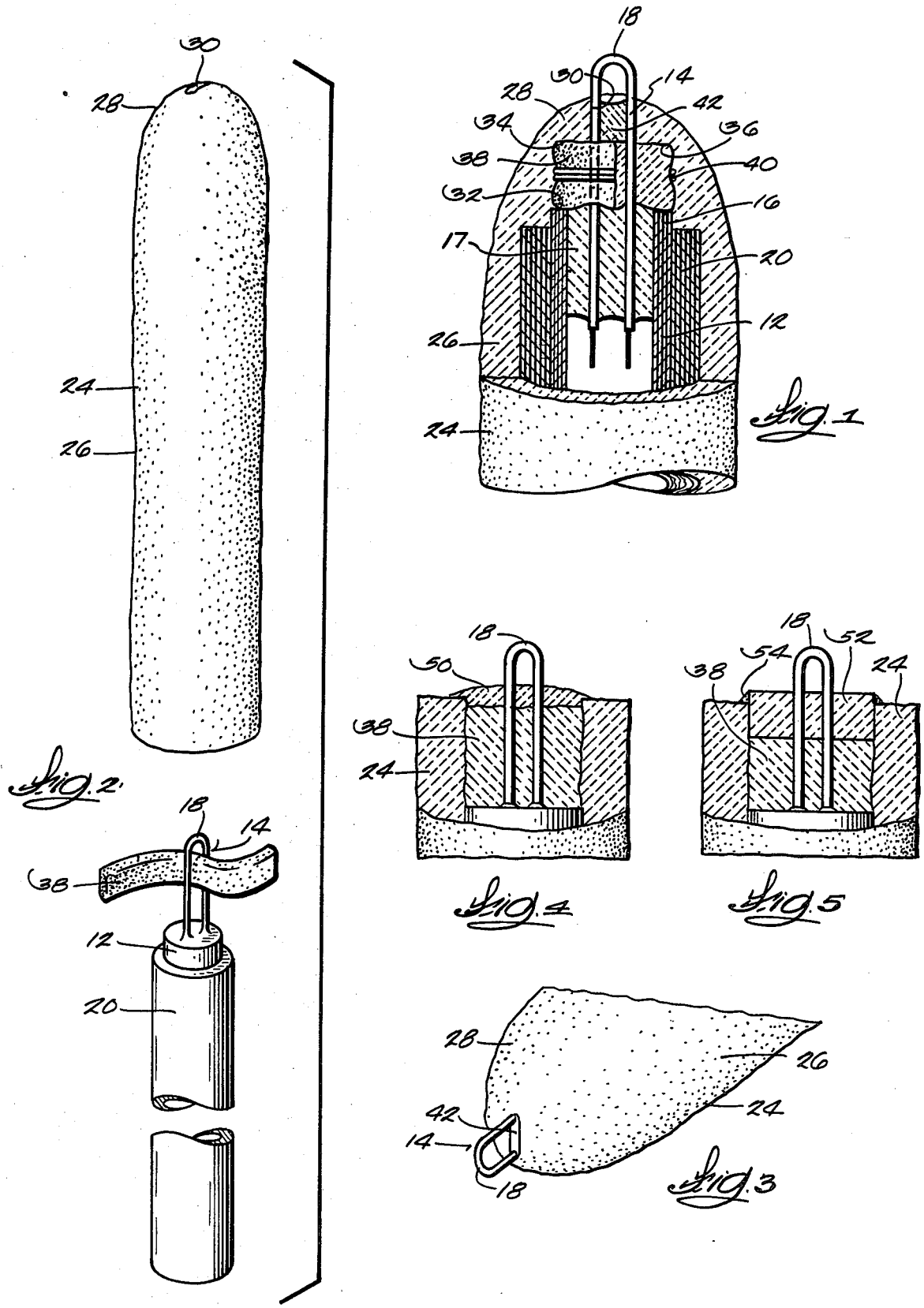

REUSABLE THERMOCOUPLE ASSEMBLY

BACKGROUND OF THE INVENTION

The invention relates to a repeating use thermocouple assembly which provides sufficient protection to the thermocouple element, cold-junction and leads to enable repeated measurements with the same assembly. U.S. Pat. No. 3,816,183 is illustrative of a repeating use thermocouple.

SUMMARY OF THE INVENTION

The present invention provides a molded protective sleeve for a thermocouple assembly with a dome-shaped end wall which is pre-formed from refractory fiber material. The dome-shaped end wall has a slot for protrusion of the tip of the U-shaped thermocouple tube. The thermocouple is conventionally mounted in one or more cardboard sleeves which are spaced from the inside surface of the end wall of the refractory fiber sleeve, providing a chamber surrounding the U-tube. Refractory fiber packing material is wrapped around the U-shaped tube to fill the chamber and insulate and protect the thermocouple tube, the ends of the cardboard tubes which support the thermocouple and the leads for the thermocouple. The use of pre-formed sleeves with an integral end wall simplifies assembly and provides good protection.

Further objects, advantages and features of the invention will become apparent from the disclosure.

DESCRIPTION OF THE DRAWINGS

FIG. 1 is a side elevational view with parts broken away showing the thermocouple assembly of the invention.

FIG. 2 is an exploded perspective view of the thermocouple assembly.

FIG. 3 is a fragmentary perspective view of the exterior of the thermocouple assembly.

FIG. 4 is a modified embodiment of the invention.

FIG. 5 is a further modified embodiment of the invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In FIG. 1, a thermocouple assembly, as illustrated, includes a cardboard paperboard sleeve 12 and a U-shaped thermocouple tube 14 supported therein. A filler or other cardboard sleeve 16 can be employed to anchor the U-tube in tube 14. Concentric cardboard sleeves or refractory material can also be employed to support the tube 14. The thermocouple element also includes a projecting tip 18 which is intended to be immersed in the molten metal to be temperature measured. The thermocouple assembly, including tube 12, is conventionally mounted in a paperboard sleeve 20. As thus far described, the parts are conventional. The thermocouple assembly can have a contact structure such as illustrated in U.S. Pat. No. 3,024,295.

In accordance with the invention, a preformed molded refractory fiber sleeve 24 is provided which has a generally cylindrical wall 26 and a dome-shaped end 28 which is provided with a slot 30 through which the tip 18 projects. A refractory fiber such as Babcock & Wilcox's "Kaowool" 2600 bulk fiber, which is 55% alumina and 44.9% silica, can be employed.

The end 32 of the cardboard sleeve 12 is spaced from the inside surface 34 of the dome when the parts are assembled to provide a chamber 36. Further protection of the U-tube 14 can be provided with a blanket of refractory fiber 38 which in the disclosed construction is wrapped around the U-tube 14 and secured in place by an elastic band 40 which facilitates assembly. Other types of temperature resistive filling can be employed in the chamber 36. The packing or filler 38 is compressed into the chamber 36 to fill the space and provide the desired insulation to protect the cold junction of the thermocouple assembly. During assembly, refractory cement 42 can be placed in the slot 30 prior to insertion of the tip 18 to make a seal.

FIG. 4 is a modified embodiment in which the dome of the refractory fiber sleeve is replaced by a cap of refractory cement 50 which encloses the blanket 38 of refractory fiber which is wadded into the refractory fiber sleeve 24.

In FIG. 5 a refractory disc 52 seals the refractory fiber blanket 38. Refractory cement 54 can be employed to secure the disc 52 to the sleeve 54. In these embodiments, as well as the embodiment shown in FIG. 1, the refractory fiber insulates the cold junction of the thermocouple.

The refractory fiber sleeve can be vacuum-formed from a slurry of fiber, binders and fillers. The Ceraform process of Johns-Manville Corp. is suitable. The binders can be either organic or inorganic and be in the form of starches, phenolic resins, colloidal silica or ball clays. The fillers can be metal oxide grains such as aluminum oxide or zirconium oxide. These fillers increase the density and strength of the sleeve as well as provide termperature resistance.

I claim:

1. In a repeating use immersion thermocouple assembly for a molten metal bath including a support tube, a temperature sensing element having a U-shaped projecting tip having spaced legs and a rigid support means in said cavity for supporting said temperature sensing element and enabling manipulation of the element in a molten metal bath, the improvement comprising a refractory fiber sleeve having a cavity for encasing and protecting said support means and said temperature sensing element, said sleeve having an opening for exposure of said projecting tip and a blanket of refractory fiber arranged around and through said legs to fill the cavity of said sleeve, and means to secure said refractory fiber in place.

* * * * *